(12) United States Patent
Bakran et al.

(10) Patent No.: US 11,424,688 B2
(45) Date of Patent: Aug. 23, 2022

(54) MODULAR POWER CONVERTER

(71) Applicant: Siemens Aktiengesellschaft, Munich (DE)

(72) Inventors: Mark-Matthias Bakran, Erlangen (DE); Jürgen Böhmer, Stein (DE); Martin Helsper, Allersberg (DE); Eberhard Ulrich Krafft, Nuremberg (DE); Bernd Laska, Herzogenaurach (DE); Andreas Nagel, Nuremberg (DE); Stefan Hans Werner Schönewolf, Nuremberg (DE); Jan Weigel, Grossenbuch (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 17/261,134

(22) PCT Filed: Jul. 22, 2019

(86) PCT No.: PCT/EP2019/069649
§ 371 (c)(1),
(2) Date: Jan. 18, 2021

(87) PCT Pub. No.: WO2020/025376
PCT Pub. Date: Feb. 6, 2020

(65) Prior Publication Data
US 2021/0297001 A1    Sep. 23, 2021

(30) Foreign Application Priority Data
Jul. 31, 2018   (EP) .................................... 18000636

(51) Int. Cl.
*H02M 5/458*    (2006.01)
*B60L 15/00*    (2006.01)

(52) U.S. Cl.
CPC ........... *H02M 5/458* (2013.01); *B60L 15/002* (2013.01); *B60L 15/007* (2013.01)

(58) Field of Classification Search
CPC ....... H02M 5/458; H02M 5/00; B60L 15/002; B60L 15/007
(Continued)

(56) References Cited

U.S. PATENT DOCUMENTS 5,078,738 A    1/1992   Couetil
2008/0315619 A1    12/2008   Oka
(Continued)

FOREIGN PATENT DOCUMENTS

DE    88 10 279 U1    10/1988
DE    10 2013 215 992 A1    2/2015
(Continued)

OTHER PUBLICATIONS

PCT International Search Report and Written Opinion of International Searching Authority dated Sep. 9, 2019 corresponding to PCT International Application No. PCT/EP2019/069649 filed Jul. 22, 2019.

*Primary Examiner* — Rexford N Barnie
*Assistant Examiner* — Swarna N Chowdhuri
(74) *Attorney, Agent, or Firm* — Henry M. Feiereisen LLC

(57) ABSTRACT

A modular power converter with wide-bandgap semiconductors, in particular SiC semiconductors. The modular power converter has at least two base units. The base units are connected together on the input side, and each base unit has an input circuit on the input side and an output circuit on the output side. The input circuit and the output circuit are each formed by the wide-bandgap semiconductors arranged in a B6-bridge circuit. An intermediate circuit capacitor is connected in parallel with the input circuit and the output
(Continued)

circuit forming an intermediate circuit. The input circuits of the base units or a sub-quantity of the base units are arranged in a series circuit. At least one inductor is arranged between each pair of input circuits.

15 Claims, 8 Drawing Sheets

(58) Field of Classification Search
USPC .......................................................... 307/9.1
See application file for complete search history.

(56) References Cited

U.S. PATENT DOCUMENTS

| | | | |
|---|---|---|---|
| 2013/0169035 A1* | 7/2013 | Nakashima | ............... B60L 7/14 |
| | | | 363/37 |
| 2013/0248883 A1 | 9/2013 | Das et al. | |
| 2014/0036418 A1* | 2/2014 | Eichler | ............... H05K 7/1432 |
| | | | 361/605 |
| 2020/0312995 A1* | 10/2020 | Nagahisa | ............ H01L 29/7811 |

FOREIGN PATENT DOCUMENTS

| | | | | |
|---|---|---|---|---|
| DE | 102013215992 A1 | * | 2/2015 | .......... H02M 5/4585 |
| EP | 0318351 A1 | | 5/1989 | |
| EP | 3 184 351 A1 | | 6/2017 | |
| JP | 2017537052 A | * | 12/2017 | |
| JP | 2018029412 A | | 2/2018 | |
| KR | 100970566 B1 | * | 7/2010 | |
| KR | 100970566 B1 | | 7/2010 | |
| RU | 153627 U8 | | 9/2015 | |

* cited by examiner

MODULAR POWER CONVERTER

CROSS-REFERENCES TO RELATED APPLICATIONS

This application is the U.S. National Stage of International Application No. PCT/EP2019/069649, filed Jul. 22, 2019, which designated the United States and has been published as International Publication No, WO 2020/025376 and which claims the priority of European Patent Application, Serial No. 18000636.3, filed Jul. 31, 2018, pursuant to 35 U.S.C. 119(a)-(d).

BACKGROUND OF THE INVENTION

The invention relates to a modular power converter with wide-bandgap semiconductors. The invention further relates to a vehicle, in particular a rail vehicle, with such a modular power converter.

Wide-bandgap semiconductors are semiconductors whose bandgap (energy gap between valence band and conduction band) is at the upper end of the range of semiconductors (3 eV to over 4 eV) (source: Wikipedia.de). Because of their performance they are expected to be used in the near future in vehicle drives as well. These drives are also known as traction, and the associated power converters are known as traction converters. Semiconductors based on silicon carbide (SiC), SiC semiconductors, are wide-bandgap semiconductors.

Traction converters for rail drives are characteristically used in a wide range of functions. On the motor side the power range is between approximately 100 kW and 2000 kW. In respect of the input voltage the range from 750V to 3000V must be covered. The SiC semiconductors (MOSFET) used in future are typically characterized by a unipolar component, namely the performance decreases significantly at higher design voltages. $R_{DS\ on}$ correlates approximately proportionally to $U_{block}^{2.5}$. Furthermore, SiC semiconductors only have a low current-carrying capacity per chip.

The current prior art for traction converters entails the use of IGBTs. These currently exist in suitable voltage classes, in the case of traction converters in rail vehicles typically 1700V, 3300V and 6500V, meaning that they directly match the rail operating voltages of 750V, 1500V and 3000V DC. There are also many current classes. The prior art thus entails the use of a suitable IGBT semiconductor for the respectively required voltage class and current class of the traction converter in the rail vehicle.

The object underlying the invention is to optimize a power converter in respect of the use of wide-bandgap semiconductors.

SUMMARY OF THE INVENTION

This object is achieved by a modular power converter with wide-bandgap semiconductors, in particular SiC semiconductors, wherein the modular power converter has at least two basic units, wherein the basic units are connected to one another on the input side, wherein a basic unit has an input circuit on the input side and an output circuit on the output side, wherein input circuit and output circuit are each formed by the wide-bandgap semiconductors which are arranged in a B6 bridge circuit, wherein an intermediate circuit capacitor is connected in parallel both to the input circuit and to the output circuit and thus the intermediate circuits of the input circuit and the output circuit are connected to one another to form an intermediate circuit, wherein the input circuits of the basic units or a subset of the basic units are arranged in a series circuit, wherein at least one inductor is arranged between two input circuits. The object is further achieved by a vehicle, in particular by a rail vehicle, with such a modular power converter, wherein the modular power converter is at least one part of the drive of the vehicle.

Further advantageous embodiments of the invention are specified in the dependent claims.

The invention is based on the finding that the object can be achieved by interconnecting several, i.e. at least two, basic units. In this case the problem is solved by a standardized basic unit which as semiconductors uses wide-bandgap semiconductors (typically based on SiC) from the optimum voltage class, which are approximately 1700V blocking voltage. 1700V proves to be approximately the optimum value, since in the case of the SiC component the thickness is still relatively small there and the on-state voltage drop is still strongly characterized by the channel resistance. The typical performance class of the basic unit is approximately 100 kW. In other words, in an advantageous embodiment the semiconductors of the input circuit and/or of the output circuit have a blocking voltage of 1700V.

The invention represents a solution for how the total power and voltage range can be covered with a basic unit based on low-voltage and low-current SiC semiconductors. To this end, use is made of the attribute that only SiC semiconductors featuring the optimum small blocking voltage and the optimum small current are used and form the basic unit, several of which can then be connected together as required in respect of power and/or supply voltage.

From these wide-bandgap semiconductors a basic unit is defined which comprises two times three phases, i.e. in each case an input circuit and an output circuit with three phases each, as well as an intermediate circuit with an intermediate circuit capacitor, and associated connections and the activation of the semiconductors. The basic unit further comprises a mechanical integration including a cooling device for the semiconductors. The electrical parts of the basic unit are here insulated against the mechanism and the cooling.

It is advantageous here that the basic unit is connected on the input side and/or the output side in parallel and/or in series to one or more further identical basic units, and as a result the overall current or the achievable voltage is increased. Thanks to a parallel connection the overall current that the modular power converter can provide is increased. The modular power converter can also have a series circuit of basic units connected in parallel, which thereby both increase overall current and enlarge the achievable voltage. The basic units are connected in series on the input side with the help of inductors in order thus to enable connection to a higher voltage. Thanks to the inductors the input current of the modular power converter can be controlled and regulated. The series connection is such that a phase of a basic unit is in each case connected with an inductor to the intermediate circuit, for example to the negative rail, of the next basic unit. The next inductors in terms of potential are then connected to the input-side-supplying positive side of the DC voltage, while the lowest negative rail in terms of potential is connected to the negative pole of the input-side DC voltage. A motor with a three-wire winding system can be connected to the three-phase output side.

It is particularly advantageous if when using several basic units a motor with several three-phase winding systems is connected to the several three-phase output sides. Examples include motors with a 6- or 9- or 12-wire winding system.

In the event of an AC supply it is advantageous if the input-side series connection of the basic units is such that on the lowest basic circuit there is a phase connection to a pole of the AC voltage. The second input-side phase connection is then connected to the second phase of the next basic unit. An inductor between the basic units may be, but does not have to be, dispensed with for use for an AC voltage present on the input side. The first phase is then again connected to the first phase of the next basic unit. Then in turn the second phase is connected to the subsequent second phase and so on until the last phase is connected to the other AC connection.

It is additionally advantageous if the supply voltage on the input side can be both DC and AC, in that either the basic units are all connected in series like a step-up converter or two of the input phases are each connected in series to the two phases of the next basic unit, such that what is known as a 4-quadrant chopper is produced.

It is additionally advantageous if a resistor is connected to the third input-side phase of the basic unit, and is used to dissipate power if during a braking operation the network cannot take up the total braking power. The function of this phase is also known as a braking chopper.

BRIEF DESCRIPTION OF THE DRAWING

The invention is described and explained in greater detail below using the exemplary embodiments illustrated in the figures, which show.

DETAILED DESCRIPTION OF PREFERRED EMBODIMENT

Figure 1:
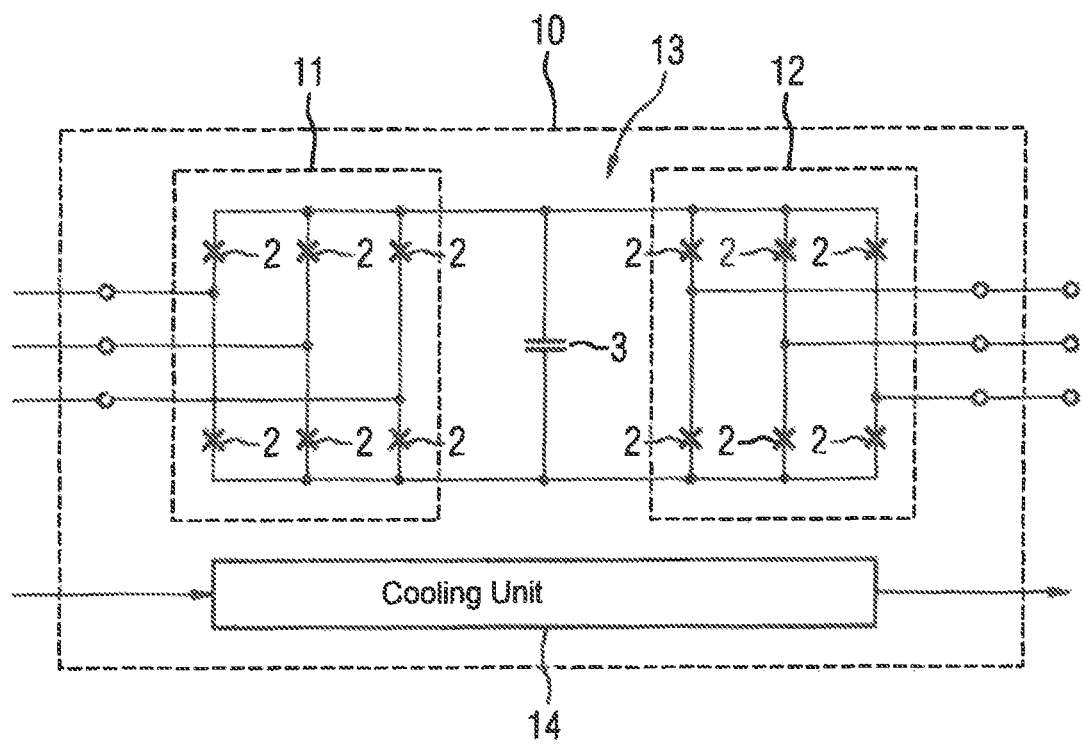
FIG. 1 a basic unit,
FIG. 2 the circuit diagram a wide-bandgap semiconductor,
FIG. 3 a parallel connection of two basic units,
FIG. 4 to FIG. 8 series circuits of basic units,
FIG. 9 a motor at the output of a modular power converter, and
FIG. 10 a vehicle with a modular power converter as part of the drive.

FIG. 1 shows a basic unit 10. This has an input circuit 11 and an output circuit 12. On the DC voltage side these are connected to one another to form an intermediate circuit 13. A capacitor 3 is arranged in the intermediate circuit 13. The input circuit 11 and the output circuit 12 each have a B6 bridge circuit made of wide-bandgap semiconductors 2. The phase connections, also called phases, are guided outward as inputs and outputs. Furthermore the basic unit has a cooling unit 14. The flow of the coolant, air or liquid is indicated with arrows.

Figure 2:
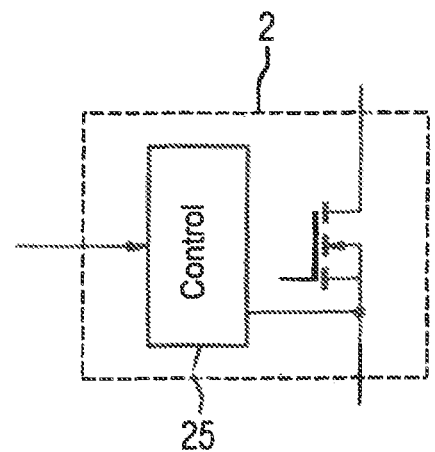

FIG. 2 shows a wide-bandgap semiconductor 2 with its control 25. This is conductive in the rearward direction. If in an embodiment this is designed so as to block rearward, an antiparallel diode (not shown here) is arranged for the semiconductor switch and imparts to the semiconductor 2 its attribute of being conductive in the rearward direction.

Figure 3:
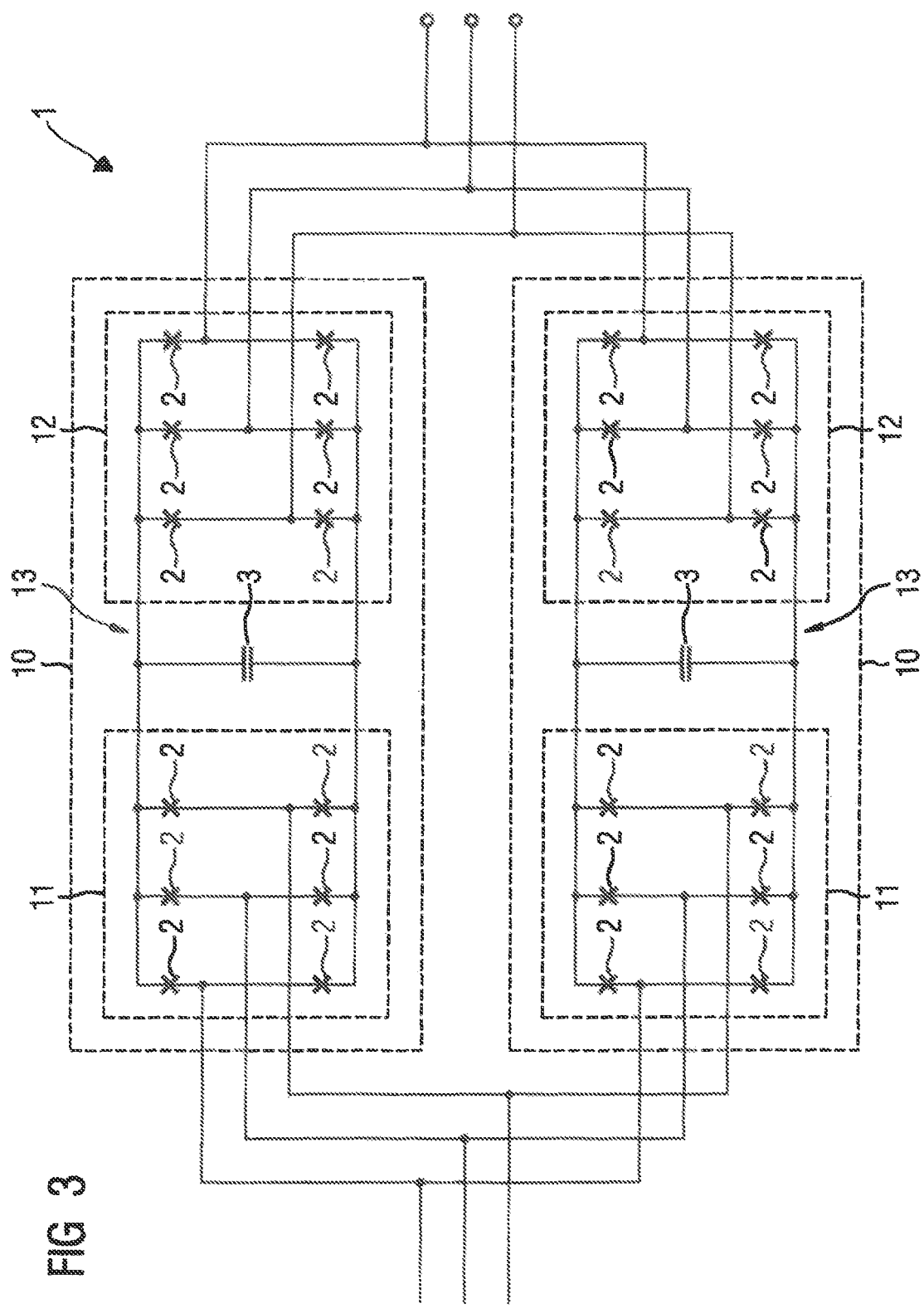

FIG. 3 shows a parallel connection of two basic units 10 in a modular power converter 1. These are connected in parallel to all three phases on both the input side and the output side.

Figure 4:
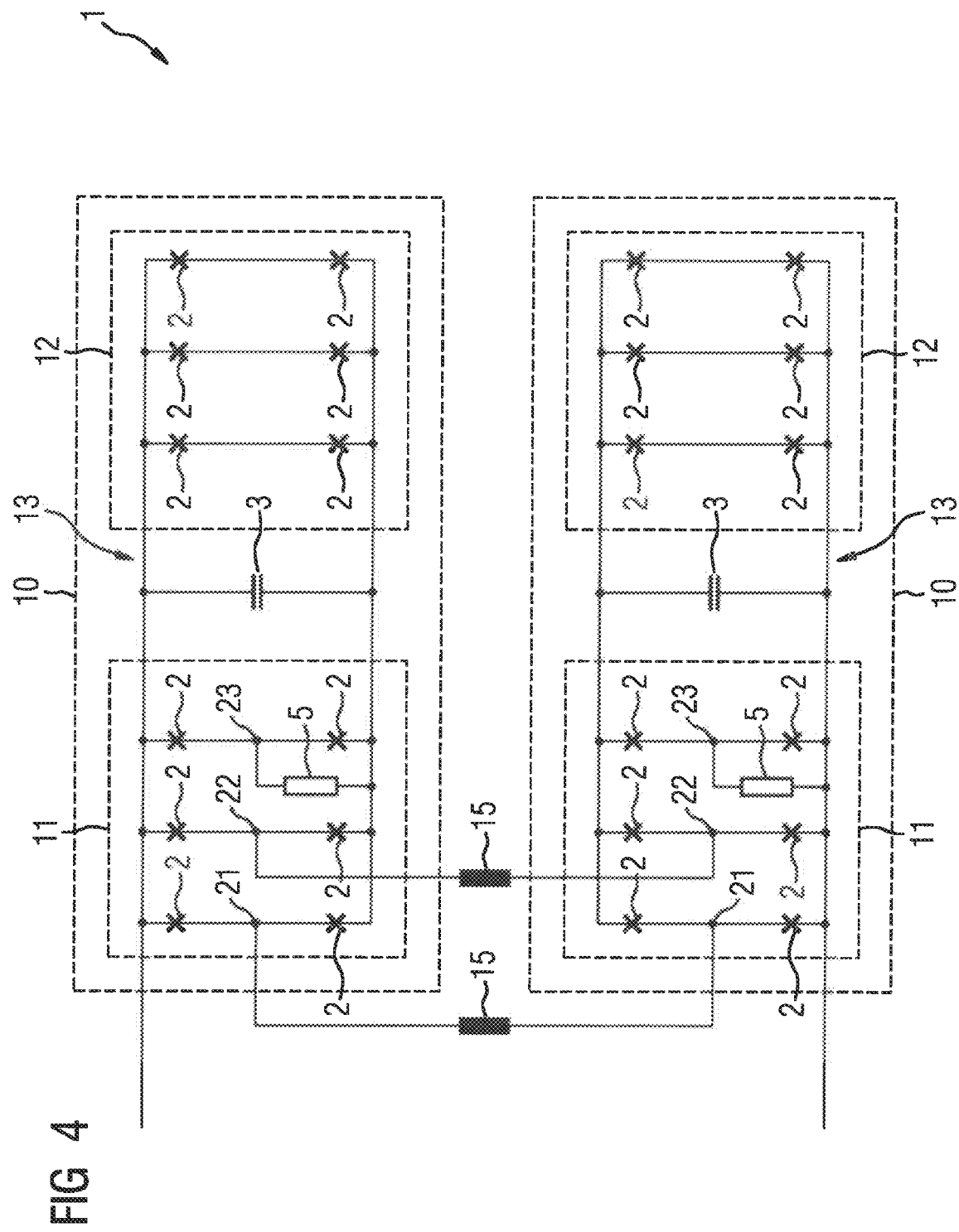

FIG. 4 shows a series circuit of two basic units 10 in a modular power converter 1. This figure only shows the principle of the series circuit. This can be expanded to any number of basic units 10. Likewise a basic unit 10 illustrated here can be a parallel connection of several basic units 10, The parallel connection takes place on the input side on the input circuit. The first phase 21 of the first input circuit is connected to the first phase 21 of the second input circuit via an inductor 15. In addition, the second phase 22 of the first input circuit is also connected to the second phase 22 of the second input circuit via a further inductor 15. The third phase 23 has a braking resistor 5 which is interconnected to form a braking chopper.

Figure 5:
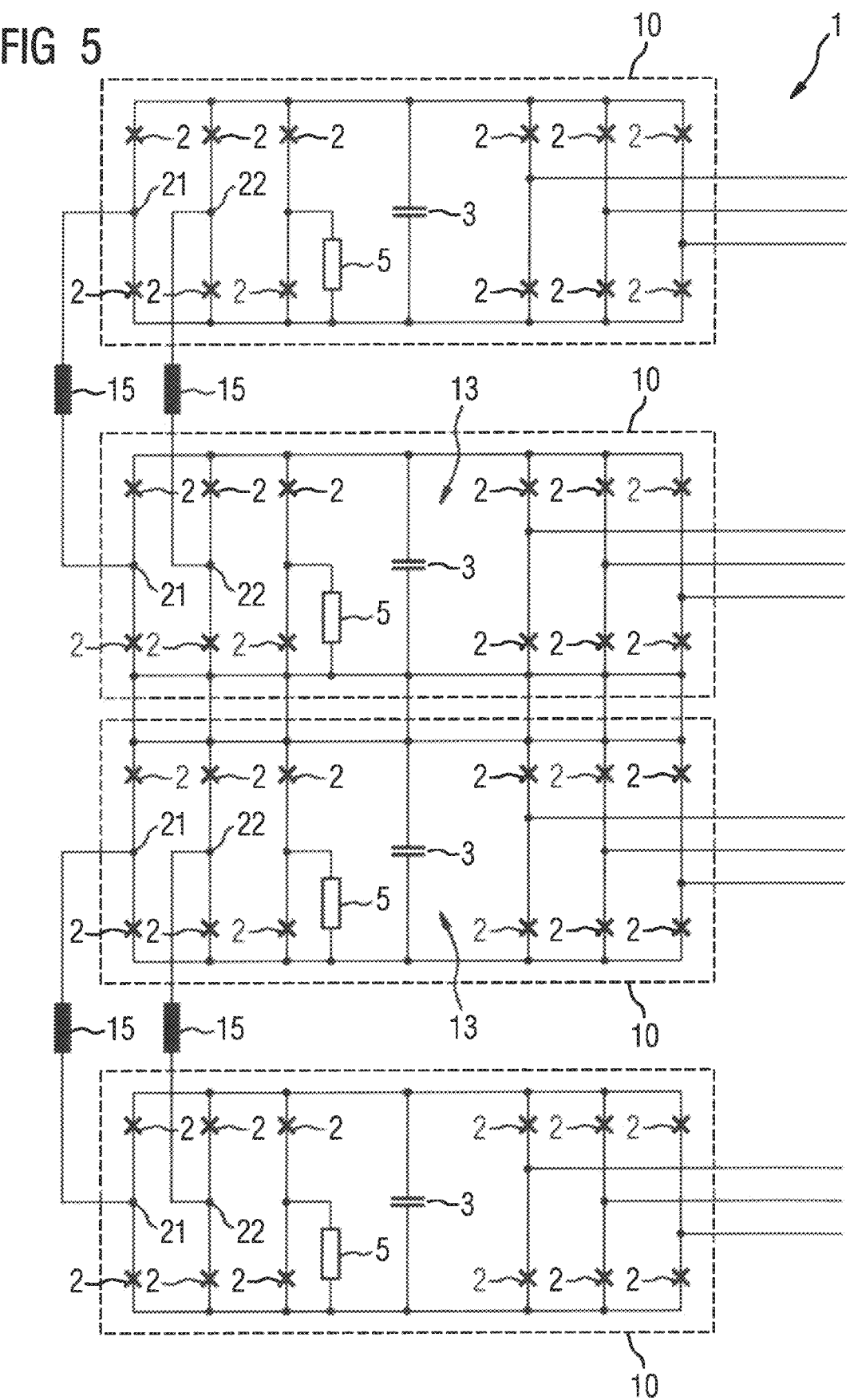

FIG. 5 shows a further exemplary embodiment of a series circuit. Here too the individual basic units 10 can represent a random parallel connection of several basic units 10. This circuit as illustrated can also be expanded to form a series circuit comprising any number of basic units. In this case it is possible to connect two basic units 10 in series to the input circuit 11 on the DC voltage side. The intermediate circuits 13 of the basic units 10 in question are then therefore connected in series. To avoid repetitions, reference is made to the description for FIG. 4 and to the reference characters introduced there.

Figure 6:
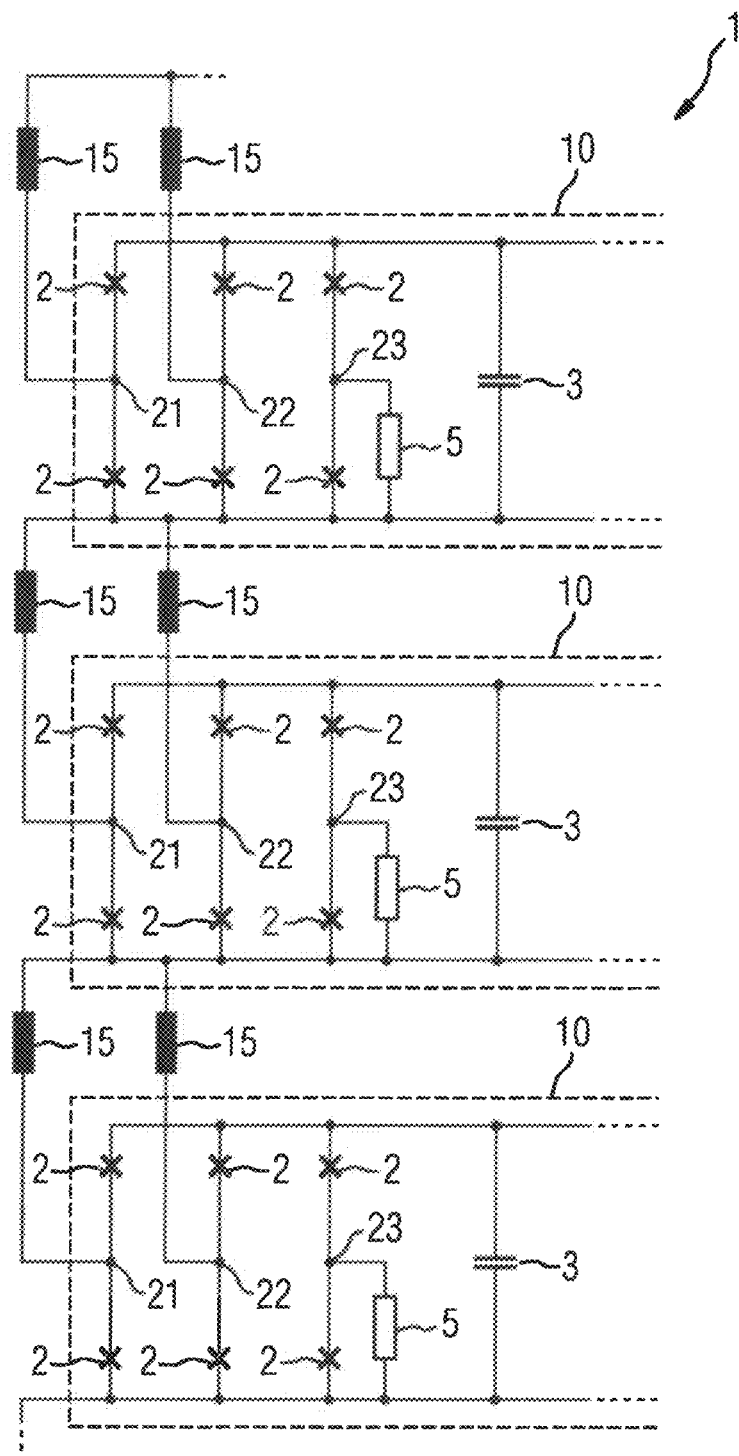

FIG. 6 shows a further exemplary embodiment of a series circuit. Here too, the individual basic units 10 can represent any parallel connection of several basic units 10. This circuit as illustrated can also be expanded to form a series circuit comprising any number of basic units 10. In this circuit the first phase 21 and the second phase 22 of a first basic unit 10 are each connected via an inductor 15 to the intermediate circuit of a second basic unit 10. Here too, basic units 10 can also have interconnections from FIGS. 4 and 5. To avoid repetitions, reference is made to the description for FIGS. 4 and 5 and to the reference characters introduced there.

Figure 7:
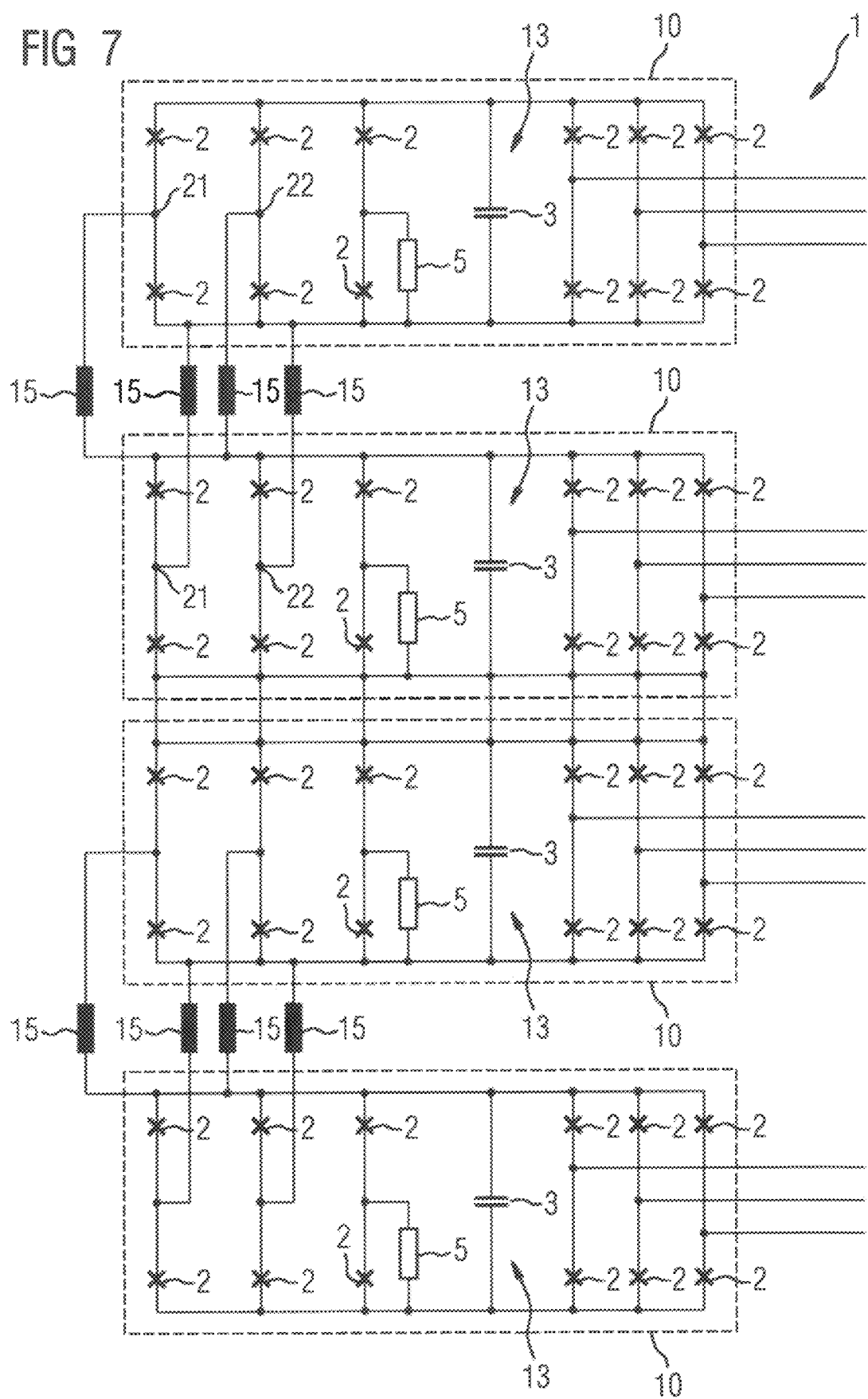

FIG. 7 shows a further exemplary embodiment of a series circuit. Here too, the individual basic units 10 can represent any parallel connection of several basic units 10. This circuit as illustrated can also be expanded to form a series circuit comprising any number of basic units 10. In this case basic units 10 can also comprise combinations of FIGS. 4 to 6. In this circuit, not only are the first phase 21 and the second phase 22 of the first basic unit 10 each connected via inductors 15 to the intermediate circuit 13 of the second basic unit 10 but in addition the first phase 21 and the second phase 22 of the second basic unit 10 are each also connected via inductors 15 to the intermediate circuit 13 of the first basic unit 10. To avoid repetitions, reference is made to the description for FIGS. 4 to 6 and to the reference characters introduced there.

Figure 8:
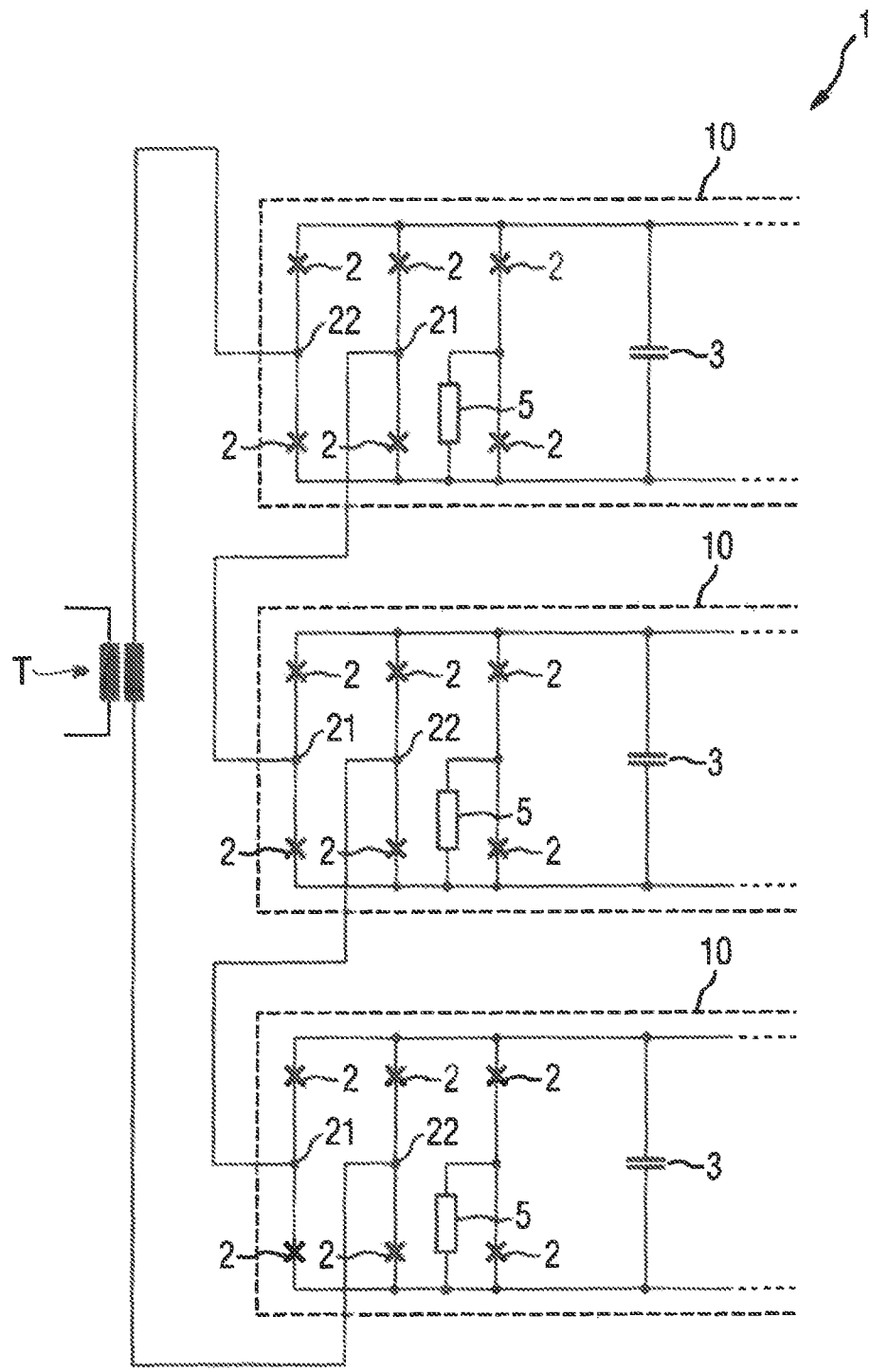

FIG. 8 shows an exemplary embodiment of a series circuit, which is in particular suitable for supplying the input side with an alternating voltage. Thanks to the inductor of the transformer T it is not necessary to introduce further inductors between the basic units 10. Here too the individual basic units 10 can represent any parallel connection composed of several basic units 10. This illustrated circuit can also be expanded to a series circuit containing any number of basic units 10, In this exemplary embodiment the first phase 21 of the first basic unit 10 is connected directly to the first phase of the second basic unit 10 and the second phase 22 of the second basic unit 10 is connected directly to a phase, in this case the first phase 21, of a third basic unit. Basic units 10 can here also comprise combinations of FIGS. 4 to 8. To avoid repetitions, reference is made to the description for FIGS. 4 to 8 and to the reference characters introduced there.

Figure 9:
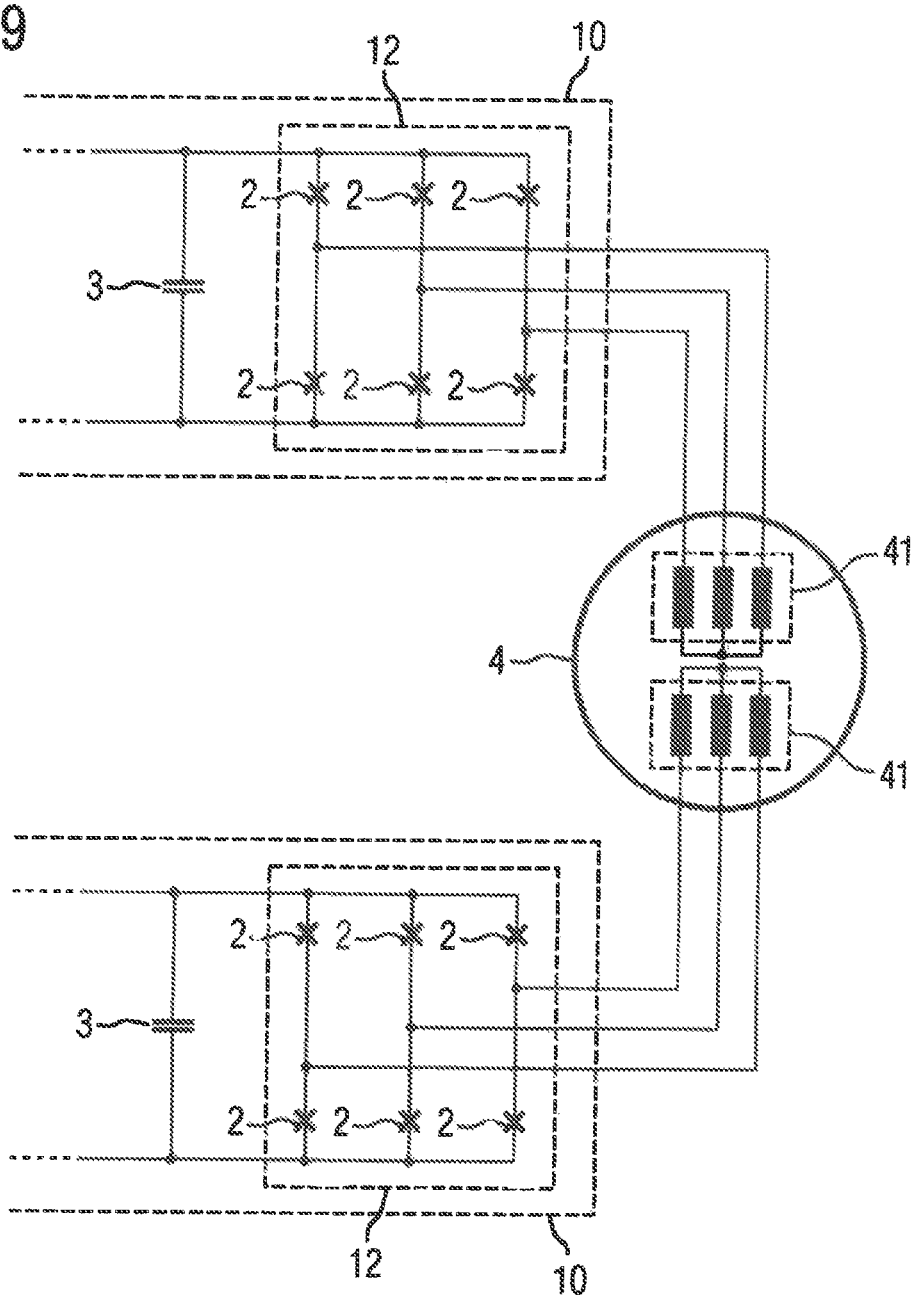

FIG. 9 shows a possible connection of the output circuits 12 to a motor 4. For reasons of clarity the input circuits 11 are not shown. These can be interconnected as desired in accordance with one of FIGS. 3 to 8, or a combination of these. The output circuits of different basic units 10 are here in each case connected to a winding system 41 of the motor.

Thus a high-performance motor 4 can be driven even if the performance of a basic unit is comparatively low.

Figure 10:
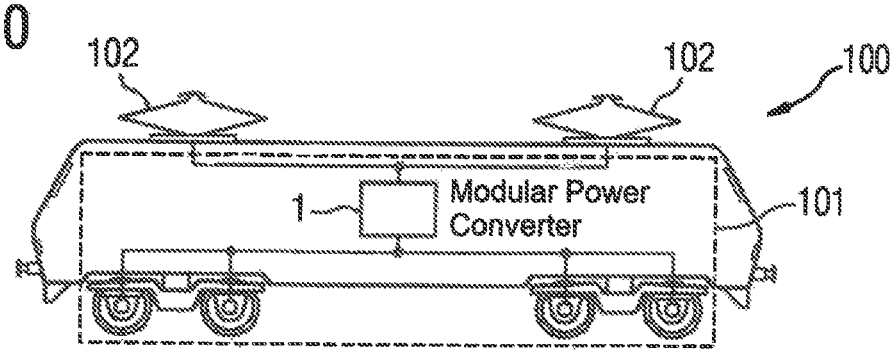

FIG. 10 shows a vehicle 100 embodied as a rail vehicle. The modular power converter 1 is here part of the drive 101 of the vehicle 100. The vehicle 100 obtains its electrical energy via a current collector 102 from a catenary (not shown) and supplies this to the input circuit of the modular power converter 1. The output circuit is connected to the motors (not shown here) of the vehicle 100 and drives them.

To summarize, the invention relates to a modular power converter with wide-bandgap semiconductors, in particular SiC semiconductors. To optimize the power converter in respect of the use of wide-bandgap semiconductors, it is proposed that the modular power converter has at least two basic units, wherein the basic units are connected to one another on the input side, wherein a basic unit on the input side has an input circuit and on the output side an output circuit, wherein input circuit and output circuit are each formed by the wide-bandgap semiconductors which are arranged in a B6 bridge circuit, wherein an intermediate circuit capacitor is connected in parallel both to the input circuit and to the output circuit and thus the intermediate circuits of the input circuit and of the output circuit are connected to one another to form an intermediate circuit, wherein the input circuits of the basic units or of a subset of the basic units are arranged in a series circuit, wherein in each case at least one inductor is arranged between two input circuits. The invention further relates to a vehicle, in particular a rail vehicle, with such a modular power converter, wherein the modular power converter is a part of the drive of the vehicle.

What is claimed is:

1. A modular power converter comprising:
   at least two basic units, each of the at least two basic units comprising an input side having an input circuit, and an output side having an output circuit said at least two basic units connected to one another on the input sides, said input circuits of the at least two basic units or a subset of the at least two basic units being arranged in a series circuit, each of the input circuits and output circuits comprising wide-bandgap semiconductors in a B6 bridge circuit configuration;
   an intermediate circuit in each of the at least two basic units, each said intermediate circuit comprising an intermediate circuit capacitor connected in parallel to both the input circuit and output circuit and connecting the input circuit to the output circuit;
   an inductor arranged between two input circuits;
   a first connection between a first phase of the input circuit of a first one of the at least two basic units and a first phase of the input circuit of a second one of the at least two basic units;
   a second connection between a second phase of the input circuit of the first one of the at least two basic units and a second phase of the input circuit of the second one of the at least twoc basic units; and
   a further said inductor, the first connection comprising one of the inductors, and the second connection comprising the further one of the inductors;
   further comprising resistors functioning has braking choppers and connected to a third phase of each of the at least two basic units in one-to-one correspondence.

2. The modular power converter of claim 1, wherein a further subset of the at least two basic units or the input circuits of a further subset of the at least two basic units are connected in parallel.

3. The modular power converter of claim 1, wherein each of the at least two basic units comprises a cooling unit electrically insulated against the wide-bandgap semiconductors.

4. The modular power converter of claim 1, wherein the input circuits of the at least two basic units are arranged in a series circuit on a direct voltage side.

5. The modular power converter of claim 1, wherein the output circuits of the at least two basic units are connected to different winding systems of a motor.

6. The modular power converter of claim 1, wherein the wide-bandgap semiconductors are embodies as SiC semiconductors and have a blocking voltage of 1700V.

7. A vehicle comprising:
   a drive comprising a modular power converter, said modular power converter comprising at least two basic units, each of the at least two basic units comprising an input side having an input circuit, and an output side having an output circuit, said at least two basic units connected to one another on the input sides, said input circuits of the at least two basic units or a subset of the at least two basic units being arranged in a series circuit, each of the input circuits and output circuits comprising wide-bandgap semiconductors in a B6 bridge circuit configuration, an intermediate circuit in each of the at least two basic units, each said intermediate circuit comprising an intermediate circuit capacitor connected in parallel to both the input circuit and output circuit and connecting the input circuit to the output circuit, an inductor arranged between two input circuits, a first connection between a first phase of the input circuit of a first one of the at least two basic units and a first phase of the input circuit of a second one of the at least two basic units, and a second connection between a second phase of the input circuit of the first one of the at least two basic units and a second phase of the input circuit of the second one of the at least two basic units;
   a current collector configured to supply electrical energy to the input circuits of the modular power converter from a catenary,
   wherein the modular power converter includes a further said inductor, the first connection comprising one of the inductors, and the second connection comprising the further one of the inductors;
   wherein the modular power converter includes resistors functioning as braking choppers and connected to a third phase of each the at least two basic units in one-to-one correspondence.

8. The vehicle of claim 7, wherein a further subset of the at least two basic units or the input circuits of a further subset of the at least two basic units are connected in parallel.

9. The vehicle of claim 7, wherein each of the at least two basic units comprises a cooling unit electrically insulated against the wide-bandgap semiconductors.

10. The vehicle of claim 7, wherein the input circuits of the at least two basic units are arranged in a series circuit on a direct voltage side.

11. The vehicle of claim 7, wherein the output circuits of the at least two basic units are connected to different winding systems of a motor.

12. The vehicle of claim 7, wherein the wide-bandgap semiconductors are embodies as SiC semiconductors and have a blocking voltage of 1700V.

13. The vehicle of claim 7, wherein the vehicle is a rail vehicle.

14. A modular power converter, comprising:
at least two basic units, each of the at least two basic units comprising an input side having an input circuit, and an output side having an output circuit, said at least two basic units connected to one another on the input sides, said input circuits of the at least two basic units or a subset of the at least two basic units being arranged in a series circuit, each of the input circuits and output circuits comprising wide-bandgap semiconductors in a B6 bridge circuit configuration; an intermediate circuit in each of the at least two basic units, each said intermediate circuit comprising an intermediate circuit capacitor connected in parallel to both the input circuit and output circuit and connecting the input circuit to the output circuit; an inductor arranged between two input circuits;
a first connection between a first phase of the input circuit of a first one of the at least two basic units and a first phase of the input circuit of a second one of the at least two basic units;
a second connection between a second phase of the input circuit of the first one of the at least two basic units and a second phase of the input circuit of the second one of the at least two basic units; and
further comprising resistors functioning as braking choppers and connected to a third phase of each the at least two basic units in one-to-one correspondence.

15. A vehicle, comprising;
a drive comprising a modular power converter, said modular power converter comprising at least two basic units, each of the at least two basic units comprising an input side having an input circuit, and an output side having an output circuit, said at least two basic units connected to one another on the input sides,
said input circuits of the at least two basic units or a subset of the at least two basic units being arranged in a series circuit,
each of the input circuits and output circuits comprising wide-bandgap semiconductors in a B6 bridge circuit configuration,
an intermediate circuit in each of the at least two basic units, each said intermediate circuit comprising an intermediate circuit capacitor connected in parallel to both the input circuit and output circuit and connecting the input circuit to the output circuit,
an inductor arranged between two input circuits,
a first connection between a first phase of the input circuit of a first one of the at least two basic units and a first phase of the input circuit of a second one of the at least two basic units, and a second connection between a second phase of the input circuit of the first one of the at least two basic units and a second phase of the input circuit of the second one of the at least two basic units;
a current collector configured to supply electrical energy to the input circuits of the modular power converter from a catenary;
wherein the modular power converter includes resistors functioning as braking choppers and connected to a third phase of each the at least two basic units in one-to-one correspondence.

* * * * *

UNITED STATES PATENT AND TRADEMARK OFFICE
CERTIFICATE OF CORRECTION

| | | |
|---|---|---|
| PATENT NO. | : 11,424,688 B2 | Page 1 of 1 |
| APPLICATION NO. | : 17/261134 | |
| DATED | : August 23, 2022 | |
| INVENTOR(S) | : Mark-Matthias Bakran et al. | |

It is certified that error appears in the above-identified patent and that said Letters Patent is hereby corrected as shown below:

On the Title Page

Item (30) Foreign Application Priority Data:
Replace "EP 18000636" with the correct --EP 18000636.3--.

Item (56) References Cited US Patent Documents:
Correct "US 2008-0315619 A1 12/2008 Oka" to read --US 2008-0315819 A1 12/2008 Ueda--.

Signed and Sealed this
Twenty-fifth Day of October, 2022

Katherine Kelly Vidal
*Director of the United States Patent and Trademark Office*